(12) United States Patent
Fujimoto

(10) Patent No.: US 8,561,372 B2
(45) Date of Patent: Oct. 22, 2013

(54) AIR EXCHANGING THERMALLY RESPONSIVE WALL PANELS AND METHODS

(75) Inventor: Koji Fujimoto, Kyoto (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/519,296

(22) PCT Filed: Oct. 14, 2011

(86) PCT No.: PCT/US2011/056442
§ 371 (c)(1), (2), (4) Date: Jun. 26, 2012

(87) PCT Pub. No.: WO2013/055370
PCT Pub. Date: Apr. 18, 2013

(65) Prior Publication Data
US 2013/0091792 A1  Apr. 18, 2013

(51) Int. Cl.
*E04C 2/00* (2006.01)
*E04B 2/00* (2006.01)

(52) U.S. Cl.
USPC ............. 52/782.1; 52/783.11; 52/787.11; 52/796.1; 52/424; 52/442; 165/201

(58) Field of Classification Search
USPC ........ 52/782.1, 783.1, 783.12, 784.1, 784.11, 52/784.14, 784.15, 791.1, 793.1, 794.1, 52/796.1, 405.4, 438, 424, 442, 787.11, 52/741.19, 404.1–405.5, 407.1–407.5, 52/169.11, 406.1, 406.2, 406.3; 165/200–201, 236
See application file for complete search history.

(56) References Cited

U.S. PATENT DOCUMENTS

| | | | | |
|---|---|---|---|---|
| 1,853,822 A * | 4/1932 | Krauss | ............ | 52/314 |
| 1,867,893 A * | 7/1932 | Roth | ............ | 60/529 |
| 2,014,035 A * | 9/1935 | Attwood | ........ | 52/461 |
| 2,198,457 A * | 4/1940 | Otis | ........ | 462/4 |
| 3,159,882 A * | 12/1964 | Slayter | ........ | 52/411 |
| 3,369,959 A * | 2/1968 | Noyes | ........ | 428/421 |
| 3,441,638 A * | 4/1969 | Stephenson et al. | ........ | 264/154 |
| 3,537,378 A | 11/1970 | Daly | | |
| 3,616,130 A * | 10/1971 | Rogosch et al. | ........ | 428/110 |
| 3,631,918 A | 1/1972 | Barrett | | |
| 3,695,967 A * | 10/1972 | Ross | ........ | 156/209 |
| 3,765,810 A * | 10/1973 | Smarook | ........ | 425/110 |

(Continued)

FOREIGN PATENT DOCUMENTS

EP   0 966 188 A2   12/1999

OTHER PUBLICATIONS

International Search Report and Written Opinion of the International Searching Authority dated Mar. 27, 2012 as received in application No. PCT/US2011/056442.

*Primary Examiner* — Jeanette E. Chapman
(74) *Attorney, Agent, or Firm* — Maschoff Brennan

(57) ABSTRACT

Thermally responsive walls can be formed of wall panels made from different materials and having staggered conduits with respect to each other when coupled together (e.g., pancaked or layered) to form a wall at one temperature. The staggered conduits in the different wall panels are configured such that they become aligned at a second temperature due to differences in expansion coefficients. The wall panels can be designed using a computing system that processes an algorithm that accounts for various parameters, such as the different thermal expansion coefficients.

20 Claims, 7 Drawing Sheets

(56) References Cited

U.S. PATENT DOCUMENTS

| | | | |
|---|---|---|---|
| 3,919,382 A * | 11/1975 | Smarook | 264/164 |
| 4,071,190 A | 1/1978 | Ford, Jr. | |
| 4,263,896 A | 4/1981 | Zebuhr | |
| 4,866,896 A | 9/1989 | Shreiner et al. | |
| 5,896,112 A | 4/1999 | Bickford et al. | |
| 6,569,710 B1 * | 5/2003 | Pierson | 438/110 |
| 7,740,976 B2 * | 6/2010 | Langan et al. | 429/71 |
| 2002/0061696 A1 | 5/2002 | Blonder | |
| 2003/0033769 A1 | 2/2003 | Record | |
| 2006/0191232 A1 | 8/2006 | Salazar et al. | |
| 2010/0132764 A1 | 6/2010 | Plaschkes | |

* cited by examiner

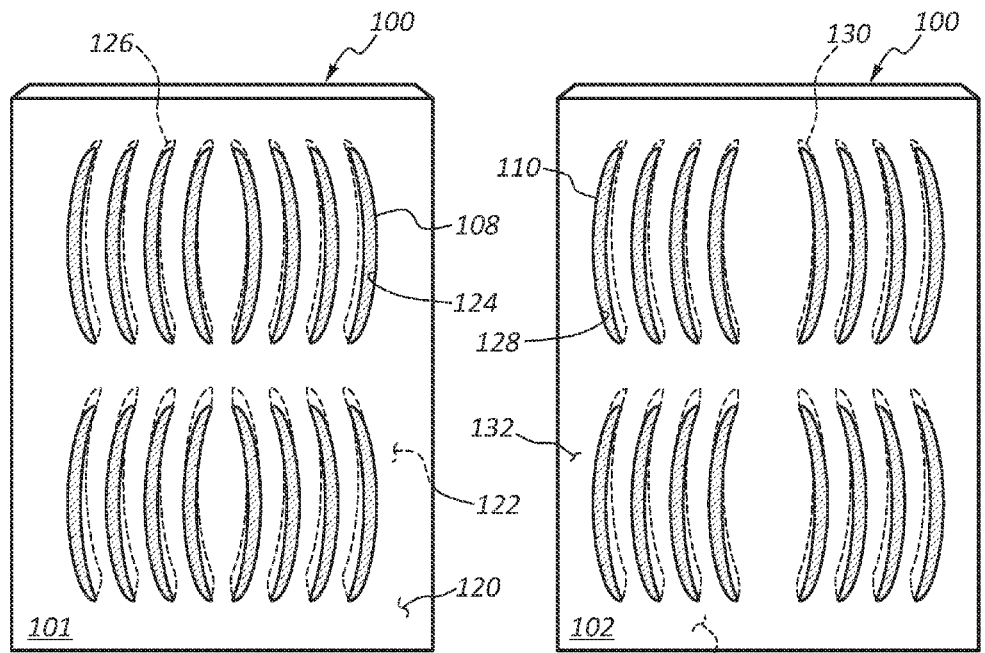
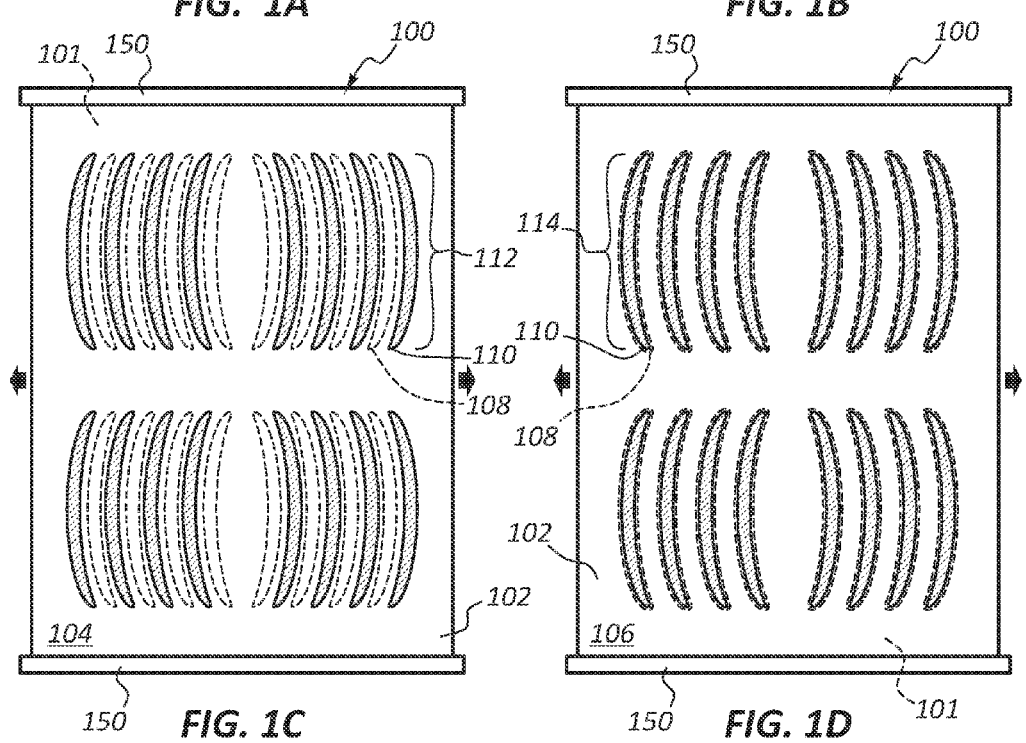

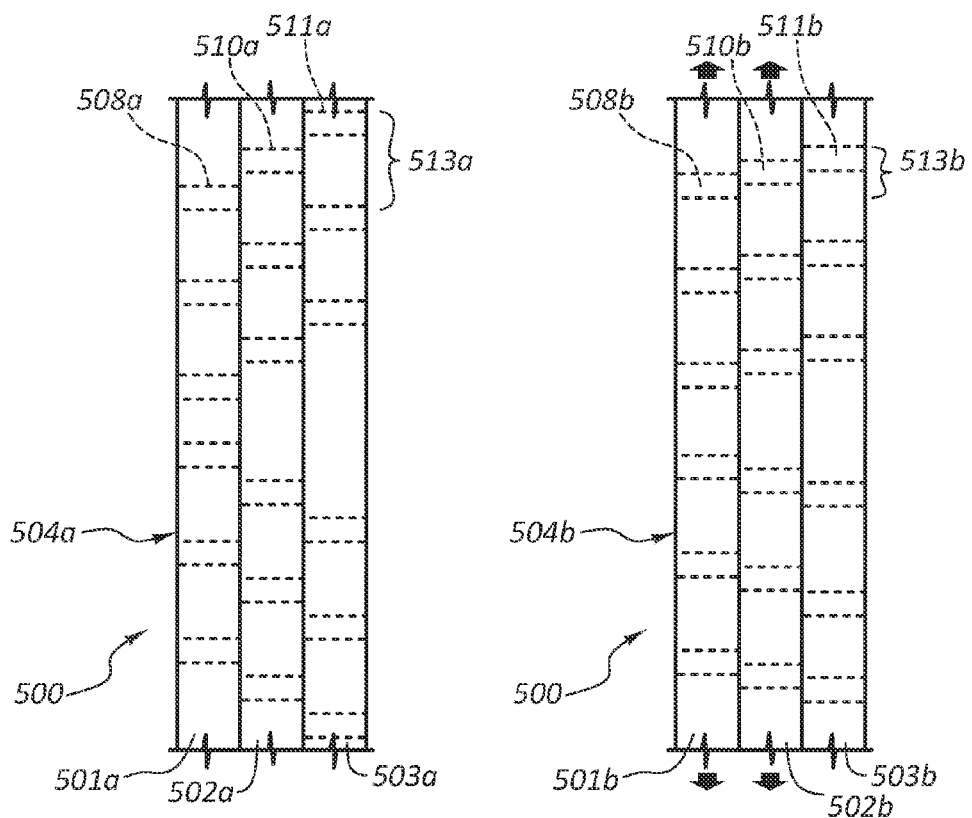
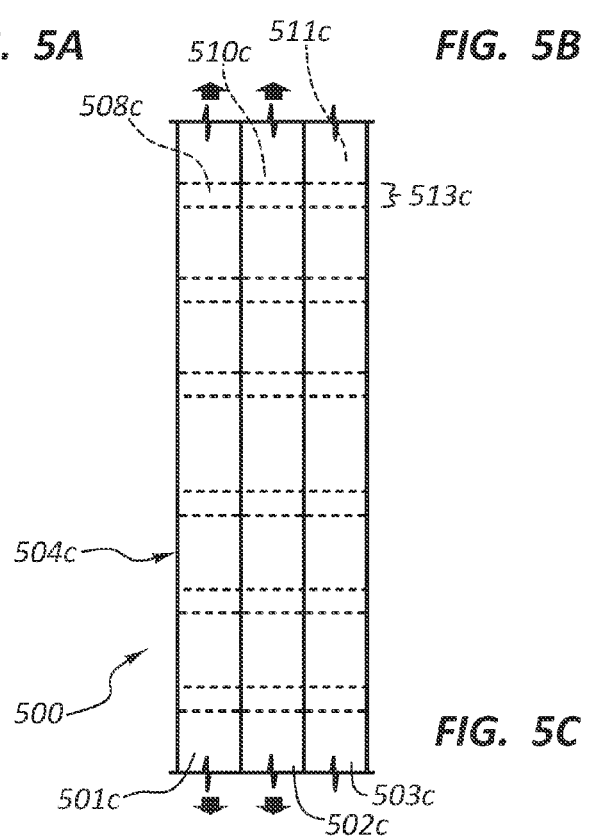

AIR EXCHANGING THERMALLY RESPONSIVE WALL PANELS AND METHODS

BACKGROUND

Recently, buildings have become more airtight to inhibit a desired temperature within a building to change toward an undesired temperature; either hotter or colder. When a heating system is used in a cold climate for a building that has significant air exchange with the outside, airflow can cause the inside of the building to decrease in temperature as colder air penetrates into the building and warmer air escapes. On the other hand, when a cooling system is used to cool the inside of a building in a warmer climate that has significant air exchange with the outside, airflow can cause the inside of the building to increase in temperature as warmer air penetrates into the building and cooler air escapes. The improvements in airtight buildings have sought to overcome the problems of inefficient indoor temperature control due to significant air exchange from inside to outside of the building. The airtightness has been increased from the perspective of saving energy and, possibly to prevent global warming due to less resources being used for energy.

While the use of building materials with high thermal insulation properties enables control of thermal movement between the inside and outside of a building, it also makes release of warmed air from the inside more difficult. The buildup of heat and increased temperatures inside a building can necessitate active ventilation of the building using fans to exchange the warmer indoor temperature to the cooler outdoor temperature. While using fans may be effective in exchanging indoor and outside air, they consume energy and may not provide sufficient thermal movement without a large vent or opening that itself can be problematic for indoor temperature control. Air conditioning with cooling systems can decrease temperatures, but they consume a lot of energy and can cause undesirable condensation.

SUMMARY

Generally, the present technology relates to thermally responsive walls formed of wall panels made from different thermally responsive materials and having staggered conduits with respect to each other when coupled together (e.g.,, pancaked or layered) to form a wall at one temperature. The staggered conduits in the different wall panels are configured such that they become aligned at a second temperature due to differences in expansion coefficients. The wall panels can expand in all three dimensions when not restricted from a frame or other abutting element. The wall panels can be designed using a computing system that processes an algorithm that accounts for various parameters, such as the different thermal expansion coefficients.

In one embodiment, a thermally responsive wall panel can include: a first wall sheet of a first material having a first expansion coefficient, the first wall sheet having an outer surface and an opposite first interstitial surface with one or more first conduits extending from one or more outer openings in the outer surface to one or more first interstitial openings so as fluidly couple the one or more first outer openings with the one or more first interstitial openings; and a second wall sheet of a material having a second expansion coefficient, the second wall sheet having an inner surface and an opposite second interstitial surface with one or more second conduits extending from one or more inner openings in the inner surface to one or more second interstitial openings so as fluidly couple the one or more inner openings with the one or more second interstitial openings, the first interstitial surface being coupled to or adjacent or in contact with the second interstitial surface in one or more discrete locations, wherein the one or more first conduits are arranged with respect to the one or more second conduits such that the one or more first conduits are not aligned with the one or more second conduits at a first temperature and such that the one or more first conduits are aligned with the one or more second conduits at a second temperature.

In one embodiment, a thermally responsive wall panel can include: a first wall sheet of a first material having a first linear expansion coefficient with one or more first conduits; and a second wall sheet of a material having a second linear expansion coefficient with one or more second conduits, the first wall sheet being coupled to or adjacent or in contact with the second wall sheet in one or more discrete locations, wherein the one or more first conduits are arranged with respect to the one or more second conduits such that the one or more first conduits are not aligned with the one or more second conduits at a first temperature and such that the one or more first conduits are aligned with the one or more second conduits at a second temperature.

In one embodiment, a kit can include: a first wall sheet of a first material having a first expansion coefficient with one or more first conduits; and a second wall sheet of a material having a second expansion coefficient with one or more second conduits, wherein the first wall sheet and second wall sheet are cooperatively configured such that one or more first conduits are arranged with respect to the one or more second conduits upon coupling the first wall conduit to the second wall conduit such that the one or more first conduits are not aligned with the one or more second conduits at a first temperature and such that the one or more first conduits are aligned with the one or more second conduits at a second temperature.

The thermally responsive wall panel can be configured for various uses, such as in a structure having one or more walls or ceilings. Some examples can include an antenna housing, a building, a multi-floor building, a house, or other. The thermally responsive wall can also be configured as a floor or a ceiling/roof. In application, the thermally responsive wall panels can be dimensioned as a full wall or a grid of panels can be combined for a wall. When used as a grid of panels, a frame can be used to hold the panels in place. Also, a buffer member prepared from a rubber or elastomeric material can be located between the frame and each panel. The buffer member can compress to allow expansion of the panels from a native size to an expanded size, and can expand when the panels retract to a native size. The buffer member can be located on one or more sides of the panel to provide a buffer zone with the frame.

In one embodiment, a method is provided for preparing a thermally responsive wall. Such a method can include: providing a first wall sheet of a first material having a first expansion coefficient with one or more first conduits; and providing a second wall sheet of a material having a second expansion coefficient with one or more second conduits; and associating (e.g., coupling or contacting) the first wall sheet to the second wall sheet in one or more discrete locations such that the one or more first conduits are arranged with respect to the one or more second conduits such that the one or more first conduits are not aligned with the one or more second conduits at a first temperature and such that the one or more first conduits are aligned with the one or more second conduits at a second temperature.

In one embodiment, a computing method is provided for designing a thermally responsive wall. The computing method can include computing the expansion coefficient of the first wall sheet and expansion coefficient of the second wall sheet as well as other parameters so as to arrive at wall sheets that when mated flat or layered they have corresponding first conduits and second conduits that are staggered (e.g., not aligned) at a first temperature but are aligned so as to form a conduit through the entire thermally responsive wall at a second temperature. The computing method can be conducted on a computing system having a computer readable media including computer executable instructions for causing the computing system to design a thermally responsive wall panel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 1A-1F provide schematic representations of embodiments of a thermally responsive wall having two wall panels made of materials having two different expansion coefficients, each wall panel having conduits that become aligned at one temperature and staggered at another temperature;

FIGS. 5A-5C provide schematic representations of an embodiment of a thermally responsive wall having three wall panels made of materials having three different expansion coefficients, each wall panel having conduits that become aligned as the temperature changes and passes a temperature threshold;

DETAILED DESCRIPTION

Figures 1E, 1F:
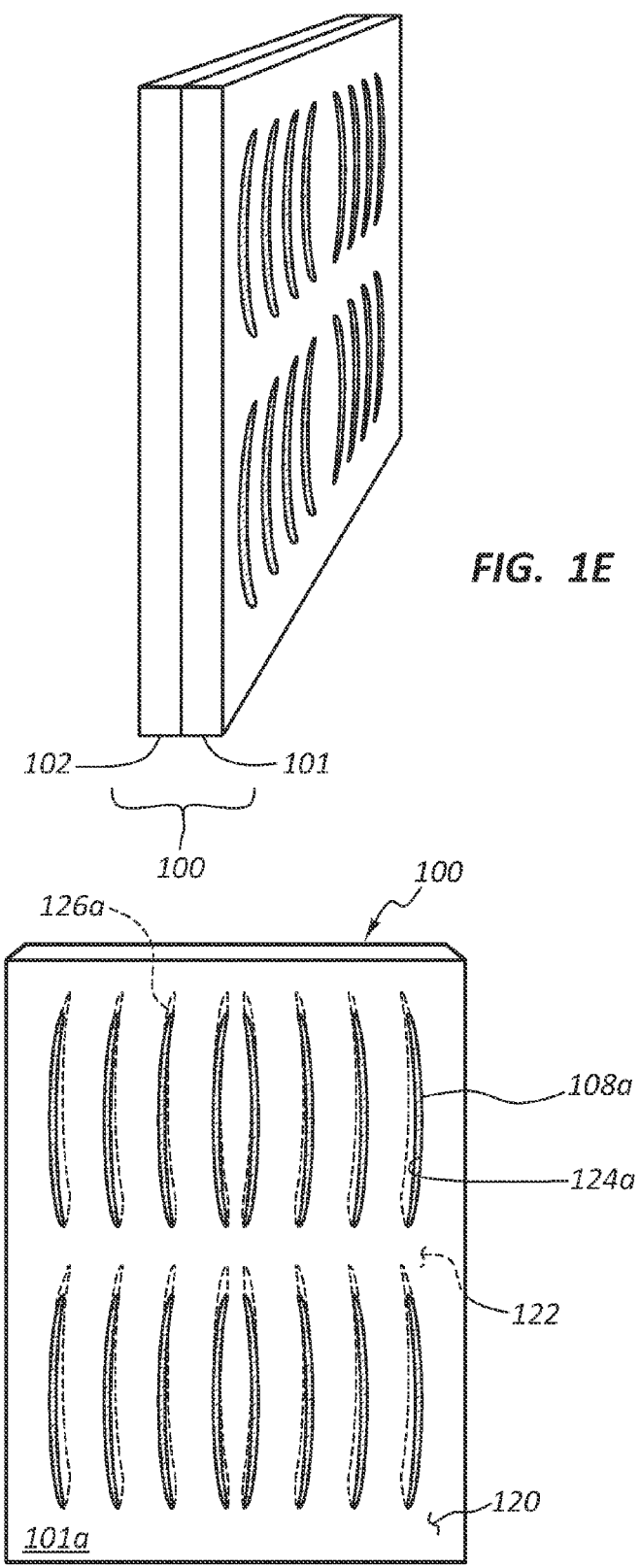

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, a thermally responsive wall panel can be prepared to facilitate air exchange by having staggered air venting conduits that become aligned to form conduits through the entire thermally responsive wall panel as the temperature crosses a temperature threshold. The thermally responsive wall panel can include wall materials that have different expansion coefficients. The wall materials are selected in order to be capable of being formed into wall panels having appropriately arranged conduits (e.g., holes or slits) formed therethrough. The different wall panels can be layered so that the air conduits change from staggered to aligned as the temperature changes. The wall panels can be of various sizes and can be configured as tiles, panels, or entire walls such that they are capable of facilitating thermally selective air exchange or venting. The wall panels can be arranged with or without frames and can expand in 3 dimensions, where X and Y directional expansion can facilitate formation of the aligned conduits. Buffer members that are compressible/expandable can be located between one or more sides of the wall panel and the frame, which buffer member can allow for the wall panels to expand and retract while maintaining a barrier to air flow.

The thermally responsive wall panel can include two or more layers of different materials having different linear expansion coefficients. The different layers can be sheets that have appropriately arranged holes or slits for selective venting. In some embodiments, the thermally responsive wall can include one sheet of a material with a large linear expansion coefficient and another sheet of a material with a small linear expansion coefficient. The difference in expansion coefficients can be used to design the sheets to have the holes or slits arranged to provide venting at a certain temperature range and to also provide airtightness or reduced venting at another temperature range.

The wall sheets can be coupled together in various configurations in order to provide for selective venting. The sheets can be arranged in a frame that holds one or more of the edges of the wall sheets together. The frame can be mounted to account for the expansion of all the sheets that are framed into a wall panel. The buffer members can be located between the frame and wall panel, and can contract when the wall panel expands and expand when the wall panel contracts from temperature changes. The buffer members may also have a thermal expansion coefficient that allows for the expansion/ contraction functionality to maintain a barrier to air flow or airtightness. The sheets may also be associated (e.g., adhered or coupled) together at one or more discrete locations, such as at the center and/or at the corners or along one or more edges to arrange the components in order as construction materials.

The wall sheets can be selectively configured for particular venting characteristics so that the wall panel provides the desired venting. In order to have desired venting, the arrangement and dimensioning of the air conduits can be determined by a computing system that processes an algorithm that accounts for various parameters. The computing system can receive input data regarding the conditions of a wall having the wall panels, and the computing system can process the data through the algorithm in order to determine one or more arrangements of air conduits in two or more wall sheets.

FIGS. 1A-1F provide schematic representations of embodiments of a thermally responsive wall panel 100 having two wall sheets 101, 102 (shown as individual sheets; FIGS. 1A and 1B) made of two different expansion coefficients, each wall sheet 101, 102 having conduits 108, 110 that become aligned at one temperature and staggered at another temperature. As such, the wall 100 has a first (closed) configuration 104 and a second (open) configuration 106 (shown as assembled panels; FIG. 1C and 1D). FIGS. 1C and 1D show expansion in the lateral or X plane as shown by the arrows with a frame 150 holding the top and bottom edges of the panel 100 from expansion in the longitudinal or Y axis.

FIG. 1A provides a schematic representation of an embodiment of a wall sheet 101 of a first material having a first expansion coefficient. The first wall sheet 101 can have an outer surface 120 and an opposite first interstitial surface 122. The first wall sheet 101 can include first conduits 108 that can extend from outer openings 124 in the outer surface 120 to first interstitial openings 126. The first conduits 108 can fluidly couple the first outer openings 124 with the first interstitial openings 126.

FIG. 1B provides a schematic representation of an embodiment of a second wall sheet 102 of a second material having a second expansion coefficient. The second wall sheet 102 can have an inner surface 134 and an opposite second interstitial surface 132. The second wall sheet 102 can include second conduits 110 that can extend from inner openings 128 in the inner surface 134 to second interstitial openings 130. The second conduits 110 can fluidly couple the inner openings 128 with the second interstitial openings 130. The first interstitial surface 122 can be associated with (e.g., coupled to) the second interstitial surface 132 in one or more discrete locations in order to form the thermally responsive wall 100. The first interstitial surface 122 and the second interstitial surface 132 may abut in some instances and there may be an interstitial space (not shown) therebetween in other instances.

FIGS. 1C-1D show the first wall sheet 101 and second wall sheet 102 formed into a thermally responsive wall 100, where the first wall sheet 101 is shown behind the second wall sheet 102. As shown in FIG. 1C, the thermally responsive wall 100 has the first configuration 104, which has the air conduits 108, 110 in a staggered and closed configuration 112. As shown in FIG. 1D, the thermally responsive wall 100 has the second configuration 106, which has the air conduits 108, 110 in an aligned and open configuration 114. Of course, the aligned and open configuration 114 can be only partially open to fully open. The aligned and open configuration 114 shows expansion in only the X plane as indicated by the arrows. The frame 150 binds the top and bottom edges of the wall panel 100 to inhibit expansion in the Y plane. Of course, the air conduits 108, 110 can be partially aligned and/or partially opened as the temperature transitions the thermally responsive wall 100 from the staggered and closed configuration 112 to the aligned and open configuration. FIG. 1E shows a side view of the thermally responsive wall 100 having the first wall sheet 101 and the second wall sheet 102.

FIG. 1F provides a schematic representation of an embodiment of a wall sheet 101a having slits 108a. The slits 108a can be configured to be at least substantially closed at a first temperature and to be substantially open at a second temperature. The substantially closed configuration can be airtight or a small amount of air may leak through. The substantially open configuration can allow airflow, which is greater than obtained from an air leak. The slit 108a can be considered to be substantially closed when visual analysis indicates that the slit 108a appears to be closed even though some air may be capable of passing through, such as when a portion of the slit 108a is closed and another portion is slightly opened. As such, a substantially closed slit 108a can be more closed than open. On the other hand, a substantially open slit 108a can be more open than closed. The slits 108a can be narrow cuts that extend from a first slit opening 124a on a first surface 120 through to a second slit opening 126a on first interstitial surface 122. When the slits 108a are open, the sheet 101a can appear with conduits 108 as in FIGS. 1A or 1B, where the wall sheets 101, 102 are aligned so that the slits are aligned. In FIG. 1F, the closed configuration can be from expansion at a higher temperature and the open configuration can be from contraction at a lower temperature. However, some materials may have expansion and a closed configuration at lower temperatures and contraction and an open configuration at higher temperatures.

Accordingly FIGS. 1A-1F show that the thermally responsive wall 100 having two or more different wall panels 101, 102 can have one or more first conduits 108 that are arranged with respect to one or more second conduits 110 such that the one or more first conduits 108 are not aligned with the one or more second conduits 110 at a first temperature (see FIG. 1C) and such that the one or more first conduits are aligned with the one or more second conduits 110 at a second temperature (see FIG. 1D).

Figure 2:
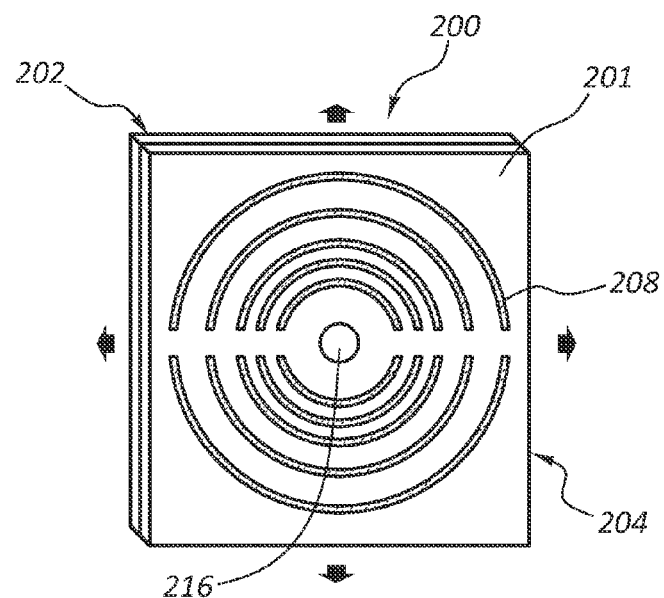
FIG. 2 provides a schematic representation of another embodiment of a thermally responsive wall having two wall panels made of materials having two different expansion coefficients, each wall panel having arc-shaped slit conduits that are spaced outward from a center at increasing distances.

FIG. 2 provides a schematic representation of an embodiment of a wall 200 having a first wall sheet 201 and a second wall sheet 202 in a closed configuration 204. This embodiment is capable of expanding in the X and Y planes so that all for side edges can expand outwardly and contract inwardly with temperature as shown by the arrows. The first wall sheet is shown to have an arrangement of air conduits 208 spaced at increasing distances at each next radial air conduit 208. While semicircular arcs are illustrated, the air conduits 208 can have any other shape. The spacing of the air conduits 208 at increasing interval distances can provide for regulated temperature exchange as the inner air conduits 208 may become aligned sooner than the outer air conduits 208 with regard to a center 216. This can provide for faster temperature change when the central air conduits 208 become aligned, but the air exchange becomes more regulated at the outer air conduits 208 become aligned.

While not shown, the air conduits 208 can have the interval distances decrease between adjacent air conduits 208 as they move further from the center 216. The larger interval distances between air conduits 208 closer to the center 216 can provide for a regulated temperature change that allows more temperature change as more of the outer air conduits 208 become aligned.

Figure 3:
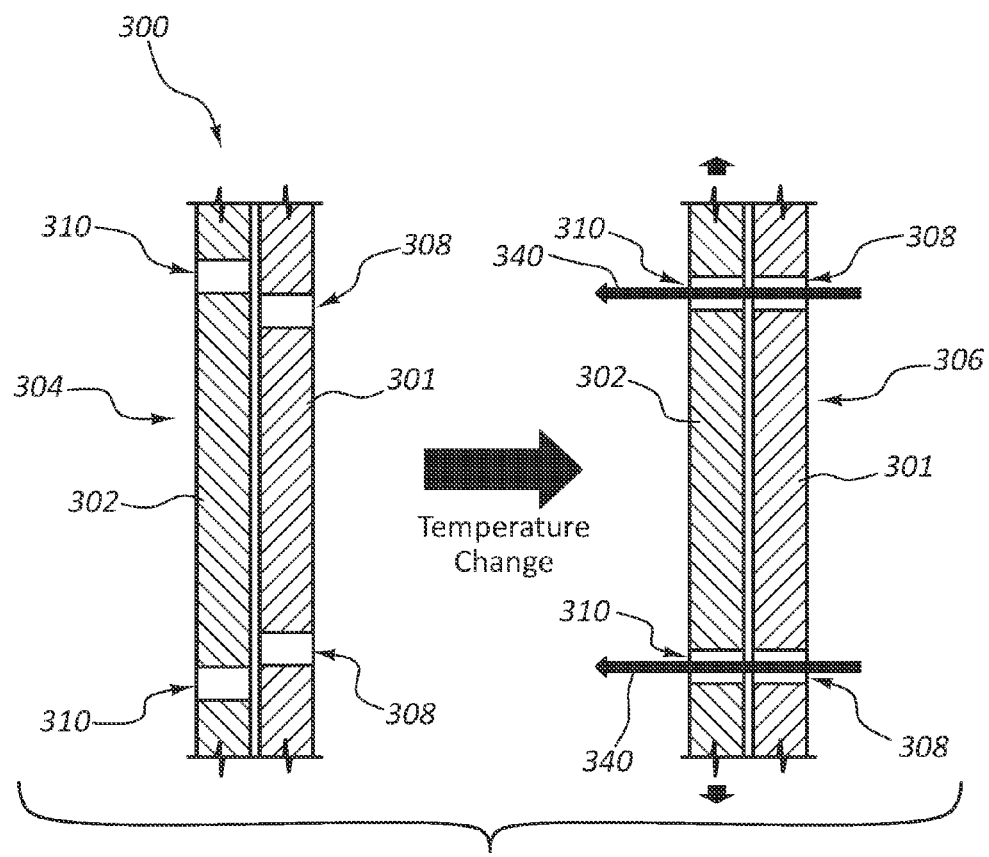
FIG. 3 provides a schematic representation of an embodiment of a thermally responsive wall having two wall panels made of materials having two different expansion coefficients, each wall panel having conduits that become aligned when the temperature is changed from one temperature to another temperature.

FIG. 3 provides a schematic representation of an embodiment of a portion of a thermally responsive wall panel 300 that has a staggered and closed configuration 304 and then after a temperature change the wall 300 has an aligned and open configuration 306. As shown, the wall panel 300 has a lower coefficient wall sheet 302 and a higher coefficient wall sheet 301 that expands relatively more from increasing temperature as shown by the arrows. When in the staggered and closed configuration 304, the lower coefficient wall sheet 302 has a conduit 310 that does not align with a conduit 308 of the high coefficient wall sheet 301. When in the aligned and open configuration 306, the lower coefficient wall sheet 301 has a conduit 310 that aligns with a conduit 308 of the high coefficient wall sheet 301. The arrows 340 illustrate the flow of air through the aligned conduits 308, 310.

Figure 4A:
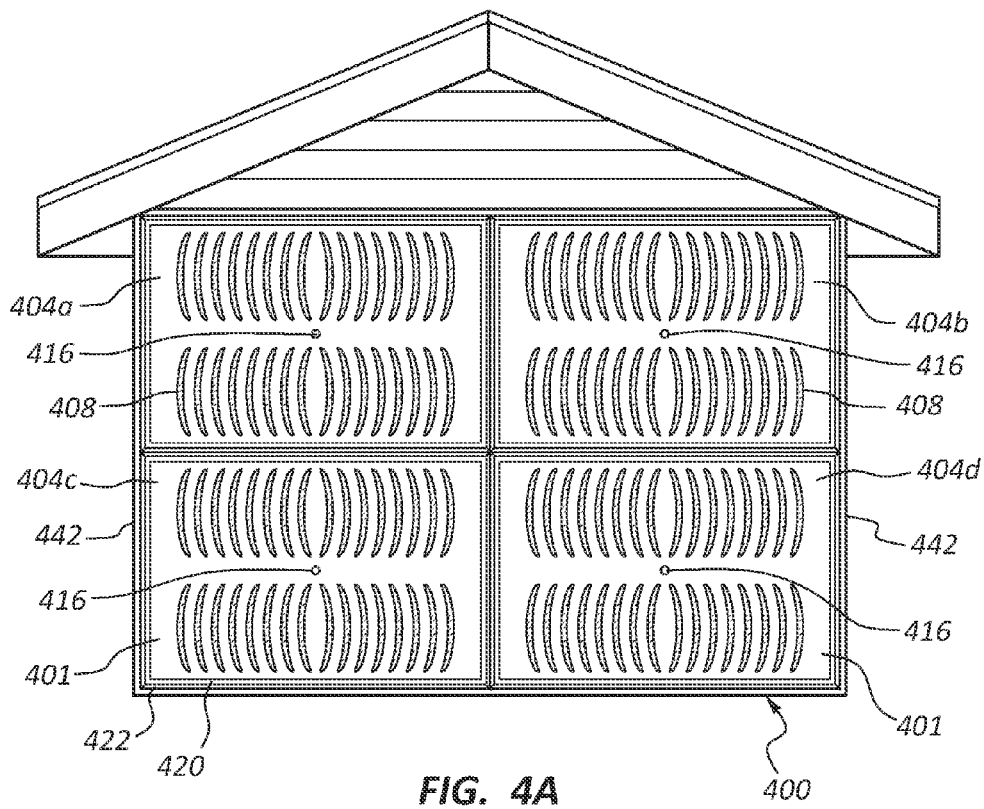
FIG. 4A provides a schematic representation of an embodiment of a structure having at least one air exchanging thermally responsive wall having a plurality of thermally responsive wall panels.

FIG. 4A provides a schematic representation of an embodiment of a building 400 that has a plurality of thermally responsive wall panels 404 (e.g., 404a, 404b, 404c, and 404d) with air conduits 408 to form a thermally responsive wall 401 configured as described herein to facilitate selective air exchange. The wall panels 404 are shown to each have a fastener 416 that fastens the wall sheets of the wall panel 404 together. The wall panel 404 is shown to have four fasteners 416 at the corners and one fastener 416 at the center. However, various other fastener arrangements can be used in order to provide the selective air exchange functionality.

FIG. 4A also shows that the wall panels 404 are each contained within a frame 442. The Frame 442 forms a grid. The frame 442 can include a frame lip 422 that retains the wall panel 404 in place. As shown, the panels 404 are received into the frame 442 and held in place with the frame lip 422. The frame 442 holds the sheets of the wall panel 404 together to allow for thermal expansion. The frame 442 can be configured to provide structural support to the wall sheets 404. The frame 442 can then be mounted into a building 400 or other structure.

Figure 4B:
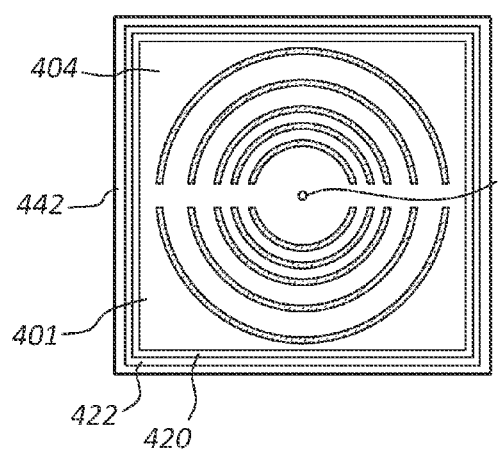
FIG. 4B provides a schematic representation of an embodiment of a thermally responsive wall panel in a frame with a buffer element located between the panel and frame.
Figure 4C:
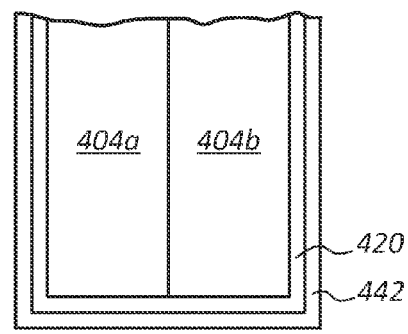
FIG. 4C is a schematic representation of a cross-sectional side view of a portion of the frame, buffer element, and thermally responsive wall panel of FIG. 4B.

FIG. 4B provides a schematic representation of an embodiment of a thermally responsive wall panel 404 in a frame 442 with a buffer element 420 located between the panel 404 and frame 442. FIG. 4C is a schematic representation of a cross-sectional side view of a portion of the frame 442, buffer element 420, and thermally responsive wall panel 404 that includes thermally responsive sheets 404a, 404b of FIG. 4B. The buffer element 420 is a elastically resilient material that can be compressed under force and expanded when released so as to go back to its native state (e.g., native dimensions). Also shown in FIG. 4B is the frame lip 422 that can hold the buffer element 420 in place. The buffer element 420 can be configured similar to memory foam such that it can be compressed and automatically expand back to its native state when the compressive force is removed; however the buffer element 420 does not need to be foam. The buffer element 420 can be any elastomeric material or rubber.

FIGS. 5A-5C provide schematic representations of an embodiment of a thermally responsive wall having three wall panels made of materials having three different expansion coefficients, each wall panel having conduits that become aligned as the temperature changes and passes a temperature threshold. FIGS. 5A-5C illustrate that a wall 500 can have a plurality of wall sheets although three wall sheets are used for illustration. Additional wall sheets can be added as desired or designed.

FIG. 5A shows a first wall sheet 501a having a first conduit 508a, a second wall sheet 502a having a second conduit 510a, and a third wall sheet 503a having a third conduit 511a. The wall sheets 501a, 502a, 503a, are arranged in the first configuration 504a where none of the conduits 508a, 510a, 511a are aligned; the conduits 508a, 510a, 511a have a staggered pattern 513a.

FIG. 5B shows a first wall sheet 501b having a first conduit 508b, a second wall sheet 502b having a second conduit 510b, and a third wall sheet 503b having a third conduit 511b. The wall sheets 501b, 502b, 503b, are arranged in an intermediate configuration 504b where some of the conduits 508b, 510b, are aligned and other conduits 511b are not aligned; the conduits 508b, 510b, 511b have a semi-staggered pattern 513b. The arrows show that wall sheet 501b and wall sheet 502b expand more than wall sheet 503b, with wall sheet 501b expanding more than wall sheet 502b.

FIG. 5C shows a first wall sheet 501c having a first conduit 508c, a second wall sheet 502c having a second conduit 510c, and a third wall sheet 503c having a third conduit 511c. The wall sheets 501c, 502c, 503c, are arranged in the second configuration 504c where all of the conduits 508c, 510c, 511c are aligned; the conduits 508c, 510c, 511c form a long conduit 513c through the entire wall 500. The arrows show that the wall sheets 501c and 502c expanded more than wall sheet 503c.

The present disclosure is not to be limited in terms of the particular embodiments illustrated in the figures, which are intended as illustrations of various aspects. Many modifications and variations can be made without departing from its spirit and scope, as will be apparent to those skilled in the art. Aspects of the figures can be included and arranged with aspects of other figures in accordance with the disclosure provided herein. Functionally equivalent methods and apparatuses within the scope of the disclosure, in addition to those enumerated herein, will be apparent to those skilled in the art from the figures. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

The various embodiments of the thermally responsive wall will now be described with respect to a first wall sheet and a second wall sheet. In one aspect, the first wall sheet or second wall sheet that has a lower expansion coefficient can be dimensioned larger than the other wall at the first temperature.

The first wall sheet and/or second wall sheet can have a planar cross-sectional profile dimensioned as at least a portion of a full wall. In some instances the wall panel can be a full wall from floor to ceiling. In some instances the wall panel can be dimensioned to extend past the floor and/or ceiling. For example, the wall panel can form a wall for a first level, and it may or may not extend past the floor into a basement or lower level and/or extend past the ceiling into an attic or upper level. In other instances the wall panels can be used like tile for a wall. The first wall sheet and second wall sheet can have the same planar cross-sectional profile. The first wall sheet and second wall sheet can have the same height and/or width. The first wall sheet and second wall sheet can have the same thickness.

The wall sheets and wall panels can have any dimensions in the X and Y planes. Reasonable dimensions can be used for the X plane. Non-limiting examples of dimensions of the X and Y plane dimensions can each independently range from 1 foot to 50 feet, from 2 feet to 40 feet, from 3 feet to 30 feet, from 4 feet to 20 feet, from 5 feet to 15 feet, from 6 feet to 10 feet, or anywhere therebeetween. Also, smaller or larger sizes may be possible.

In one aspect, the first wall sheet and second wall sheet can have different planar cross-sectional profiles. Also, the first wall sheet and second wall sheet can have different height and/or width. The first wall sheet and second wall sheet can have different thicknesses.

In one embodiment, the first material of the first wall sheet has a lower expansion coefficient and the second wall sheet has a higher expansion coefficient. In one example, the first material is metal and the second material is polymeric, or vice versa. In another example, the first and second materials are both metals. In another example, the first and second materials are both polymeric. In another example, the first and/or second material is ceramic. In another example, the first and/or second material is a natural material. In another example, the first and/or second material is a modified natural material, such as fiber board, plywood, or combinations thereof. In another example, the first or second material with a lower expansion coefficient is selected from glass, aluminum, brass, carbon steel, copper, gold, iron, lead, nickel, silicon, silver, stainless steel, or steel, and the first or second material with a higher expansion coefficient is selected from wood, rubber, polyethylene, polyacetal, polyvinylchloride, or other polymeric material.

In one embodiment, the first or second material with a lower linear expansion coefficient ranges from about $1 \times 10^{-6}/°$ C. to about $30 \times 10^{-6}/°$ C. at 20° C., and the other material has a higher linear expansion coefficient greater than or about $30 \times 10^{-6}/°$ C. at 20° C. In one example, first material has a higher expansion coefficient compared to the second material. In another example, the first material has a lower expansion coefficient compared to the second material. The first and/or second material can have a linear expansion coefficient. In one example, the first or second material has an expansion coefficient of greater than or about $1 \times 10^{-4}/°$ C. in magnitude and the other material has an //expansion coefficient of less than or about $1 \times 10^{-5}/°$ C. in magnitude. In another example, the first or second material with a lower volumetric expansion coefficient ranges from about $1 \times 10^{-6}/°$ C. to about $90 \times 10^{-6}/°$ C. at 20° C., and the other material has a higher linear expansion coefficient greater than or about $100 \times 10^{-6}/°$ C. at 20° C.

In one embodiment, the wall can be flat. Alternatively, the wall can be curved. The conduits can be straight or curved, normal to the wall or at an angle, such as 45 degrees.

The wall sheets can be arranged so that one or more of the first slit conduits of a first wall sheet correspond with one or more second slit conduits of a second wall sheet. The first conduits and corresponding second conduits can have similar cross-sectional profiles. Also, the first conduits and corresponding second conduits can have different cross-sectional profiles. In one example, the first conduits and/or second conduits can have a slit cross-sectional profile. The first conduits and/or second conduits can have a flat slit cross-sectional profile. Alternatively, the first conduits and/or one or more second conduits can have a curved slit cross-sectional profile. Also, the first conduits and/or second conduits can have a circular slit cross-sectional profile. The first conduits and/or second conduits may also have a squared slit cross-sectional profile. In one aspect, the first conduits and/or second conduits can have a rounded cross-sectional profile. In another aspect, the first conduits and/or second conduits can have a squared cross-sectional profile. In another aspect, the first conduits and/or second conduits can have a polygonal cross-sectional profile. The first conduits and/or second conduits have a predetermined cross-sectional profile determined from the first and/or second material expansion coefficients. The configuration of the conduits can be predetermined using a computing system that calculates the conduits based on the material expansion coefficients.

The computing system can also calculate the placement of the conduits. This can include the first conduits and/or second conduits being randomly distributed across the first wall sheet and/or second wall sheet. Alternatively, the first conduits and/or second conduits can be evenly distributed across the first wall sheet and/or second wall sheet. Also, the first conduits and/or second conduits can be symmetrically distributed across the first wall sheet and/or second wall sheet with respect to a center point of the first wall sheet and second wall sheet.

In one embodiment, the first conduits and/or second conduits can be configured as two or more concentric arcs with respect to a center point of the first wall sheet and second wall sheet, such as shown in FIG. 2. The first conduits and/or second conduits can be located at increasing intervals from a center point of the first wall sheet and/or second wall sheet. Alternatively, the first conduits and/or second conduits can be located at decreasing intervals from a center point of the first wall sheet and/or second wall sheet.

The first conduits and/or second conduits can have a center axis orthogonal with a plane of the first wall sheet and/or second wall sheet. Alternatively, the center axis can be at an angle from 90 degrees to about 45 degrees to about 10 degrees.

The first wall sheet and second wall sheet can be coupled by being affixed. In one example, the affixation of the first wall sheet and second wall sheet is via an adhesive. In another example, the affixation is via a mechanical fastener. In another example, the affixation is via a frame. In another example, the first wall sheet and second wall sheet are coupled by contact.

The wall sheets can be coupled together at various discrete locations. As such, the first wall sheet and second wall sheet can be coupled at a common center point of both the first wall sheet and second wall sheet. In one aspect, the first wall sheet and second wall sheet can be coupled at one or more corresponding corners of both the first wall sheet and second wall sheet. In one aspect, the first wall sheet and second wall sheet can be coupled at one or more perimeter edges. The one or more discrete locations can be located at a common center point of the first wall sheet and second wall sheet. As such, the common center point of the first wall sheet and second wall sheet can be devoid of a conduit.

The thermally responsive wall panel can be configured such that under the first temperature the outer surface and inner surface are not fluidly coupled. Also, under the second temperature the outer surface and inner surface are fluidly coupled. This can include the outer surface and inner surface becoming more fluidly coupled as the temperature changes from the first temperature to the second temperature. By becoming "more fluidly coupled," the conduits in the walls move from a non-fluidly coupled orientation toward a fully fluidly coupled orientation. For example, the transition of moving from the conduits being unaligned toward being completely aligned results in outer surface and inner surface being "more fluidly coupled." Accordingly, the first conduits and second conduits can become more fluidly coupled as the temperature changes from the first temperature to the second temperature. In one example, the first temperature is higher than the second temperature. Alternatively, the first temperature is lower than the second temperature.

In one embodiment, the thermally responsive wall can be part of a structure. In one example, the thermally responsive wall can be an internal wall of the structure. In another example, the thermally responsive wall can be an external wall of the structure. The structure can be configured to house an antenna.

In one embodiment, the structure having the thermally responsive wall can further include a mechanical air conditioning system configured to selectively heat or cool the wall. The mechanical air conditioning system can include any components of systems that regulate the temperature of air, such as but not limited to, fans, louvers, swamp coolers, air conditioning units, or other mechanical devices used to regulate temperature in a structure.

In one embodiment, the thermally responsive wall can include a third wall sheet located adjacent to the first or second wall sheet. The third wall sheet can have a third expansion coefficient that is different from at least one of the first expansion coefficient or second expansion coefficient. The third wall sheet can have one or more third conduits. The third conduits can be arranged with respect to the first or second conduits such that the first or second conduits are not aligned with the third conduits at a first temperature and such that the first or second conduits are aligned with the third conduits at a second temperature.

In one embodiment, the thermally responsive wall can include a plurality of wall sheets having one or more expansion coefficients. Each of the plurality of walls can have one or more conduits arranged with respect to the first or second conduits such that the first or second conduits are not aligned with the one or more conduits of the plurality at a first temperature and such that the first or second conduits are aligned with the one or more conduits of the plurality at a second temperature.

A first sheet can be composed of a high molecular weight substance with a large linear expansion coefficient such as polyethylene ($1.9 \times 10^4$), polyacetal ($1 \times 10^4$), polyvinylidence chloride ($1.9 \times 10^4$) or other such resin material. The second sheet can be composed of a metal material with a small linear expansion coefficient such as stainless steel, SUS410 or 5US440 ($1 \times 10^4$).

For example, the first wall sheet can be high-molecular weight polyethylene. The temperature difference can be about 30° C. between winter (5° C.) and summer (35° C.). The first wall sheet can have slit conduits at positions 50 mm, 100 mm, and 200 mm away from the center of the sheet. These slit conduits can have positional deviations of 0.6 mm, 1.2 mm, and 2.4 mm, respectively, between the summer and winter. As such, the slit conduit interval can be determined to allow for an increase in deviation the further the distance from the center.

In one embodiment, a thermally responsive wall can be provided as a kit that can be assembled on site. The kit can include a first wall sheet of a first material having a first expansion coefficient with one or more first conduits. Also, the kit can include a second wall sheet of a material having a second expansion coefficient with one or more second conduits. The first wall sheet and second wall sheet can be cooperatively configured such that one or more first conduits are arranged with respect to the one or more second conduits upon coupling the first wall conduit to the second wall conduit such that the one or more first conduits are not aligned with the one or more second conduits at a first temperature and such that the one or more first conduits are aligned with the one or more second conduits at a second temperature. The kit can also include an adhesive, a fastener, and/or a frame to mount the wall sheets together to form the wall.

Figure 7:
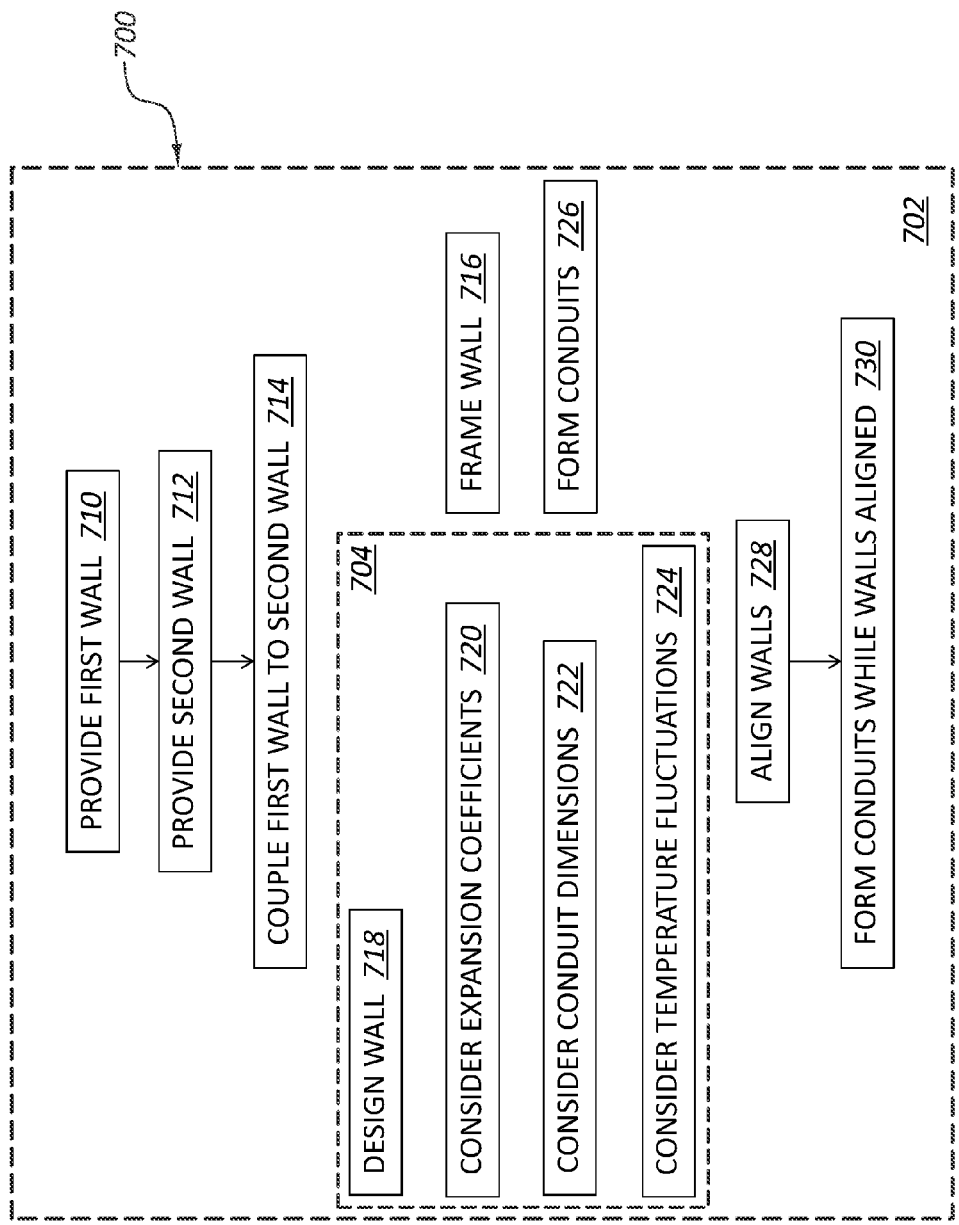
FIG. 7 flow diagram as a representation of a method for preparing a thermally responsive wall, arranged in accordance with at least one of the embodiments described herein, and which arrangement may be modified in accordance with the disclosure provided herein by one of ordinary skill in the art.

FIG. 7 illustrates a method 700 that can be used for preparing a thermally responsive wall. The method 700 can include providing a first wall sheet of a first material having a first expansion coefficient with one or more first conduits ("PROVIDE FIRST WALL," block 710). The method 700 can include providing a second wall sheet of a material having a second expansion coefficient with one or more second conduits ("PROVIDE SECOND WALL," block 712). Then, the first wall sheet can be coupled to the second wall sheet in one or more discrete locations ("COUPLED FIRST WALL TO SECOND WALL," block 714). The first wall sheet can be coupled to the second wall sheet so that the one or more first conduits are arranged with respect to the one or more second conduits such that the one or more first conduits are not aligned with the one or more second conduits at a first temperature and such that the one or more first conduits are aligned with the one or more second conduits at a second temperature. The dashed box 702 indicates that some processes can be conducted at various points within the method.

In one embodiment, the method 700 can include framing the coupled first and second wall sheets with a frame ("FRAME WALL," block 716). As such, the coupling can be via a frame that frames the first and second wall sheets. In one aspect, the method can include the coupling is via adhesive. In another aspect, the coupling is via a mechanical fastener.

In one embodiment, the method can include designing the first wall sheet and second wall sheet to have corresponding first conduits and second conduits ("DESIGN WALL," block (718). The smaller dashed 704 bock indicates that the process of designing the wall can be conducted on a computing system. The designing process can include considering the first expansion coefficient and second expansion coefficient ("CONSIDER EXPANSION COEFFICIENTS." block 720). The design process can also include considering dimensions of the first and second conduits ("CONSIDER CONDUIT DIMENSIONS," block 722). The design process can include considering arrangement of the first and second conduits. The design process can include considering temperature fluctuations ("CONSIDER TEMPERATURE FLUCTUATIONS," block 724). For example, the temperature fluctuations can be daily, weekly, monthly, seasonal, yearly, or other period.

The temperature fluctuations can also be from one or more operational electronic devices located in a structure having the thermally responsive wall. The one or more electronic devices can include network electronic devices. The one or more electronic devices can be data storage facility devices.

In one embodiment, the method 700 can include forming the first conduits in the first wall sheet and forming the second conduits in the second wall sheet ("FORM CONDUITS," block 726). The conduits can be formed separately on the individual sheets.

In one embodiment, forming the conduits can include: aligning the first wall sheet and second wall sheet at the second temperature ("ALIGN WALLS," block 728); and forming the first conduits and second conduits while the first wall sheet and second wall sheet are aligned at the second temperature ("FORM CONDUITS WHILE WALLS ALIGNED," block 730).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
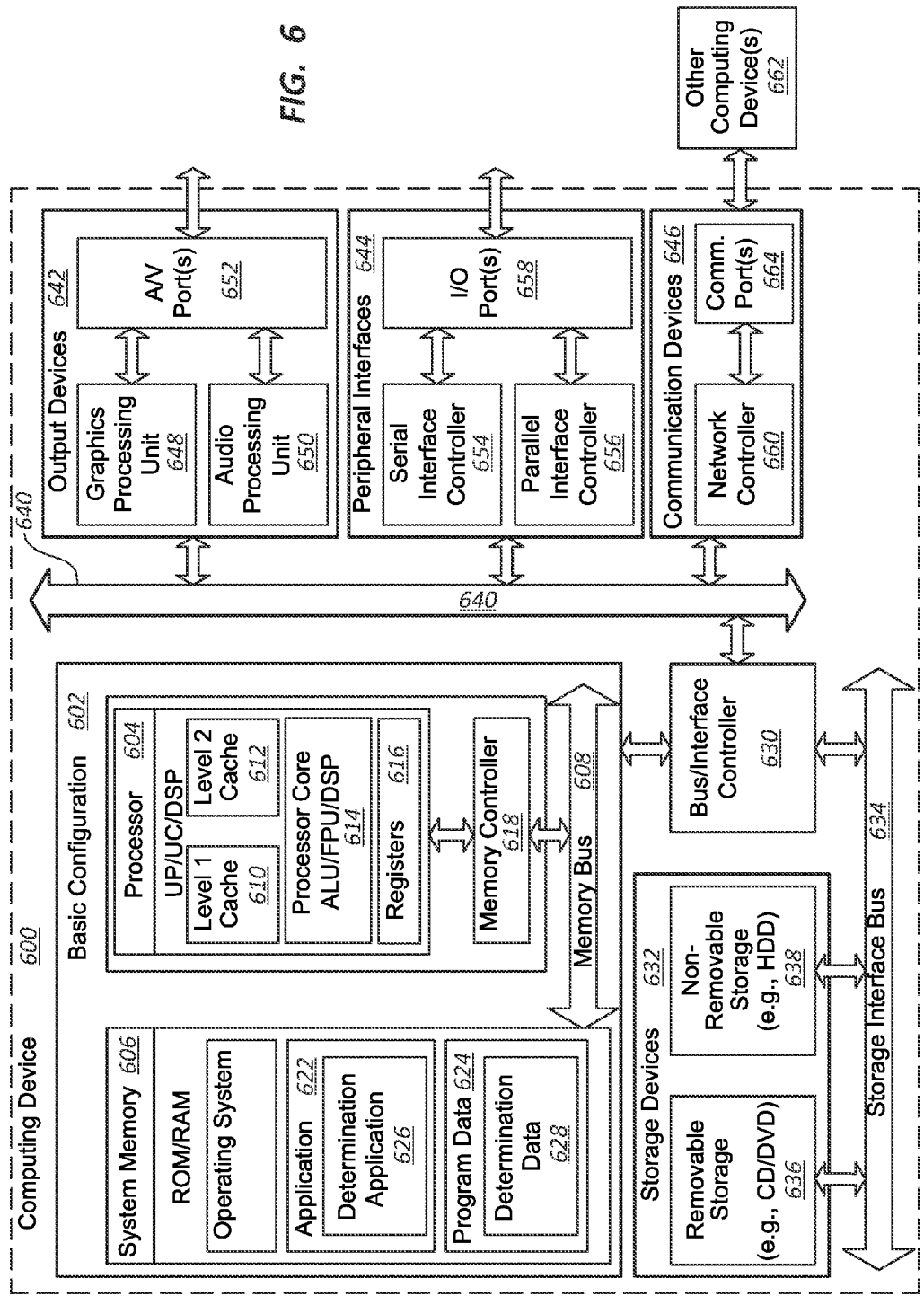
FIG. 6 provides a schematic representation of a computing system configured to design a thermally responsive wall.

FIG. 6 shows an example computing device 600 that is arranged to perform any of the computing methods described herein. The computing system 600 can represent a user side computing device, such as a mobile smart phone, as well as an application marketplace search facilitating server, arranged in accordance with at least some embodiments described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein.

Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. A wall panel comprising:
   a first wall sheet of a first material having a first expansion coefficient, the first wall sheet having one or more first conduits extending therethrough; and
   a second wall sheet of a material having a second, different expansion coefficient, the second wall sheet having one or more second conduits extending therethrough, surfaces of the first and second wall sheets adjacent one another,
   wherein a difference between the first and second coefficients of expansion enables movement of at least one of the first and second wall sheets with respect to the other of the first and second wall sheets such that the one or more first conduits are not aligned with the one or more second conduits at a first temperature and are aligned with the one or more second conduits at a second, different temperature.

2. The wall panel of claim 1, wherein a wall sheet of a material having a lower expansion coefficient is dimensioned larger than a corresponding wall sheet of a material having a higher expansion coefficient at the first temperature.

3. The wall panel of claim 1, wherein one of the first and second material has a linear expansion coefficient ranging from about $1 \times 10^{-6}/°$ C. to about $30 \times 10^{-6}/°$ C. at 20° C., and the other of the first and second material has a linear expansion coefficient greater than about $30 \times 10^{-6}/°$ C. at 20° C.

4. The wall panel of claim 1, wherein first material has a higher expansion coefficient compared to the second material.

5. The wall panel of claim 1, wherein the first material has a lower expansion coefficient compared to the second material.

6. The wall panel of claim 1, wherein one of the first and second material has an expansion coefficient of greater than about $1 \times 10^{-4}/°$ C. and the other of the first and second material has an expansion coefficient of less than about $1 \times 10^{-5}/°$ C.

7. The wall panel of claim 1, wherein the one or more first conduits and the one or more second conduits have corresponding shapes.

8. The wall panel of claim 7, wherein the one or more first conduits and the one or more second conduits have corresponding cross-sectional profiles.

9. The wall panel of claim 7, wherein the one or more first conduits and the one or more second conduits have different cross-sectional profiles.

10. The wall panel of claim 1, wherein the one or more first conduits and the one or more second conduits are randomly distributed across the first wall sheet and second wall sheet.

11. The wall panel of claim 1, wherein the one or more first conduits and the one or more second conduits are symmetrically distributed across the first wall sheet and second wall sheet with respect to a center point of the first wall sheet and second wall sheet.

12. The wall panel of claim 1, wherein the one or more first conduits and the one or more second conduits are configured as two or more concentric arcs with respect to a center point of the first wall sheet and second wall sheet.

13. The wall panel of claim 1, further comprising a frame binding opposite edges of the first wall sheet and second wall sheet to prevent expansion of the first wall sheet and the second wall sheet in a second direction perpendicular to a first direction in which the first and second wall sheets to move with respect to one another.

14. The wall panel of claim 13, further comprising a resilient element positioned between the frame and one or more sides of the first wall sheet and the second wall sheet, the resilient element configured to compress upon expansion of the second wall sheet and to expand upon contraction of the second wall sheet.

15. The wall panel of claim 1, further comprising a third wall sheet having one or more third conduits are arranged with respect to the one or more first or second conduits such that the one or more first or second conduits are not aligned with the one or more third conduits at a first temperature and such that the one or more first or second conduits are aligned with the one or more third conduits at a second temperature.

16. A wall panel comprising:
    a first wall sheet of a first material having a first linear expansion coefficient with one or more first conduits; and
    a second wall sheet of a material having a second, different linear expansion coefficient with one or more second conduits, the first wall sheet being associated with the second wall sheet in one or more discrete locations,
    wherein a difference between the first and second coefficients of expansion enables movement of at least one of the first and second wall sheets with respect to the other of the first and second wall sheets such that the one or more first conduits are not aligned with the one or more second conduits at a first temperature and are aligned with the one or more second conduits at a second, different temperature.

17. A method of fabricating a wall panel, the method comprising:
- forming a first material into a first sheet with one or more first conduits;
- forming a second material having an expansion coefficient different from the first material into a second sheet with one or more second conduits; and
- positioning the first sheet and the second such that the one or more first conduits are not aligned with the one or more second conduits at a first temperature and such that the one or more first conduits are aligned with the one or more second conduits at a second temperature.

18. The method of claim 17, further comprising binding opposite edges of the first and second wall sheets with a frame configured to prevent expansion of the first and second wall sheets in at least one direction.

19. The method of claim 17, further comprising forming the one or more first conduits to have a shape substantially corresponding with a shape of the one or more second conduits.

20. The method of claim 17, wherein the forming includes:
- aligning the first wall sheet and second wall sheet at the second temperature; and
- forming the first conduits and second conduits while the first wall sheet and second wall sheet are aligned at the second temperature.

* * * * *